United States Patent [19]

Yoshimura et al.

[11] Patent Number: 5,293,529
[45] Date of Patent: Mar. 8, 1994

[54] THREE-DIMENSIONAL INFORMATION HANDLING SYSTEM

[75] Inventors: Tetsuya Yoshimura, Kawasaki; Yasuhiro Nakamura, Tama; Masataka Sugiura, Machida, all of Japan

[73] Assignee: Matsushita Electric Industrial Co., Ltd., Osaka, Japan

[21] Appl. No.: 848,601

[22] Filed: Mar. 9, 1992

[30] Foreign Application Priority Data

Mar. 12, 1991 [JP] Japan .................................. 3-046574
Jan. 31, 1992 [JP] Japan .................................. 4-016040

[51] Int. Cl.$^5$ ............................................. G09G 5/08
[52] U.S. Cl. .................................... 345/158; 345/157; 345/179; 273/438
[58] Field of Search ............... 340/706, 707, 708, 709, 340/710, 711, 712, 729; 273/433, 438

[56] References Cited

U.S. PATENT DOCUMENTS

| | | | |
|---|---|---|---|
| 4,578,674 | 3/1986 | Baker et al. | 340/710 |
| 4,613,866 | 9/1986 | Blood | 343/448 |
| 4,734,690 | 3/1988 | Woller | 340/729 |
| 4,766,423 | 8/1988 | Ono et al. | 340/709 |
| 4,808,979 | 2/1989 | DeHoff et al. | 340/709 |
| 4,812,829 | 3/1989 | Ebina et al. | 340/709 |
| 4,835,528 | 5/1989 | Flinchbaugh | 340/709 |
| 4,987,527 | 1/1991 | Hamada et al. | 340/709 X |
| 5,060,135 | 10/1991 | Levine et al. | 364/200 |
| 5,146,212 | 9/1992 | Venolia | 340/710 X |

FOREIGN PATENT DOCUMENTS 62-269277 11/1987 Japan .
63-52266 3/1988 Japan .
2238215 5/1991 United Kingdom .

Primary Examiner—Jeffery Brier
Attorney, Agent, or Firm—Lowe, Price, LeBlanc & Becker

[57] ABSTRACT

A three-dimensional information handling system includes a display device for indicating a virtual three-dimensional space on a two-dimensional screen, and a position and orientation designating device for designating information of a three-dimensional position and a three-dimensional orientation. A position and orientation measuring device serves to measure the three-dimensional position and orientation information which is designated by the position and orientation designating device. A processing device serves to calculate three-dimensional display information on the basis of the three-dimensional position and orientation information measured by the position and orientation measuring device, and serves to control the display device and the position and orientation measuring device. A cursor is indicated on the screen of the display device. The cursor is moved in accordance with movement of the position and orientation designating device. A figure is indicated on the screen of the display. The figure extends from the cursor. The figure is moved in accordance with the movement of the cursor.

21 Claims, 16 Drawing Sheets

THREE-DIMENSIONAL INFORMATION HANDLING SYSTEM

BACKGROUND OF THE INVENTION

1. Field of the Invention

This invention relates to a three-dimensional information handling system in computer graphics.

2. Description of the Prior Art

In the field of computer graphics, there are various techniques of stereographically indicating three-dimensional graphics information on a two-dimensional screen such as the screen of a CRT. In general, a three-dimensional cursor is used in designating a point within an indicated three-dimensional space and in selecting one of indicated three-dimensional figures (objects). In some cases, it is difficult to understand the positional relation between a three-dimensional cursor and a three-dimensional object on a screen. In addition, selecting one of three-dimensional objects by using a cursor tends to be troublesome.

U.S. Pat. No. 4,812,829 discloses a three-dimensional display device which includes a display, an input section, and a controller. The display indicates a three-dimensional image, a vector cursor, and a pointing image (pointer) extending in a direction of movement of the vector cursor. The controller generates a display signal to execute the indication of the three-dimensional image, the vector cursor, and the pointing image. The controller recognizes the three-dimensional image crossing to the pointing image in response to the pointing signal form the input section.

U.S. Pat. No. 4,808,979 relates to a cursor for use in a three-dimensional imaging system. The cursor includes a reference symbol, a tether symbol, and a pointer symbol.

U.S. Pat. No. 4,835,528 discloses a cursor control system in which hairs passing through a cursor assist the user in unambiguously locating the cursor within a three-dimensional object.

SUMMARY OF THE INVENTION

It is an object of this invention to provide an improved three-dimensional information handling system.

A first aspect of this invention provides a three-dimensional information handling system comprising a display device for indicating a virtual three-dimensional space on a two-dimensional screen; a position and orientation designating device for designating information of a three-dimensional position and a three-dimensional orientation; a position and orientation measuring device for measuring the three-dimensional position and orientation information which is designated by the position and orientation designating device; a processing device for calculating three-dimensional display information on the basis of three-dimensional position and orientation information measured by the position and orientation measuring device, and for controlling the display device and the position and orientation measuring device; means for indicating a cursor on the screen of the display device; means for moving the cursor in accordance with movement of the position and orientation designating device; means for indicating a figure on the screen of the display, the figure extending from the cursor; and means for moving the figure in accordance with movement of the cursor.

A second aspect of this invention provides a three-dimensional information handling system comprising a three-dimensional origin designating section; a position and orientation designating section for designating three-dimensional information according to a positional relation with the three-dimensional origin designating section; a position and orientation measuring section for reading the three-dimensional information which is designated by the position and orientation designating section; an instruction input section for inputting an instruction; a control section for analyzing an output signal of the instruction input section, and generating a control signal in response to the output signal of the instruction input section; a target object managing section for managing data of a target object in a virtual three-dimensional space; a cursor managing section for managing data of a three-dimensional cursor which moves in the virtual three-dimensional space in accordance with movement of the position and orientation designating section; a cursor extension figure managing section for managing data of a three-dimensional figure extending from the cursor, the cursor extension figure moving in accordance with movement of the cursor; a positional relation processing section for calculating a relation between the cursor extension figure and each of objects on the basis of the data managed by the cursor extension figure managing section and the target object managing section in response to the control signal generated by the control section, and for selecting one of the objects in accordance with the calculated relations; a selected object storing section for storing data of the object selected by the positional relation processing section; an object processing section for processing the data of the target object on the basis of the data in the selected object storing section and the target object managing section in response to the control signal generated by the control section, and for updating the data in the target object managing section; and a display data generating section for generating output data on the basis of the data is the cursor managing section, the cursor extension figure managing section, and the target object managing section.

A third aspect of this invention provides a three-dimensional information handling system for use with a two-dimensional screen which comprises a manually-operated movable member; means for indicating a three-dimensional cursor on the screen; means for indicating a three-dimensional pointer on the screen, the pointer representing an orientation of the cursor; means for moving the cursor and the pointer in accordance with the movement of the movable member; means for indicating three-dimensional object images on the screen; means for detecting one of the object images which intersects the pointer; means for selecting the object image which intersects the pointer in response to a selecting instruction; and means for controlling the selected object image in response to a control instruction.

DESCRIPTION OF THE FIRST PREFERRED EMBODIMENT

Figure 1:
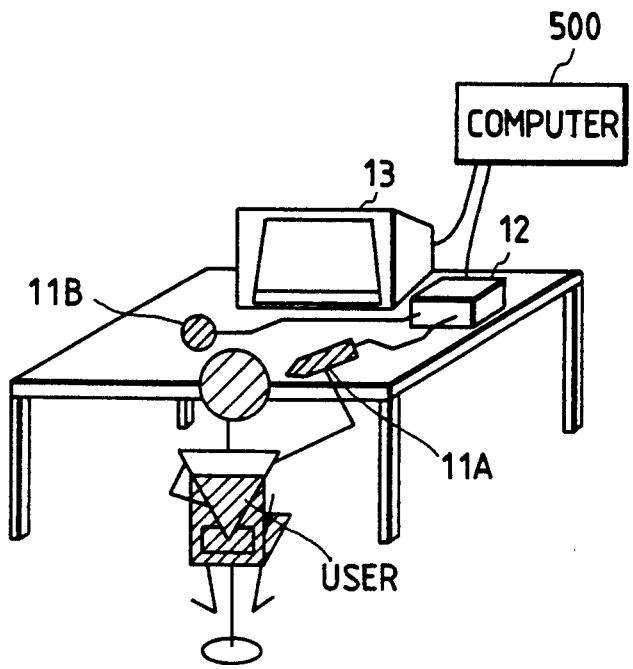
FIG. 1 is a diagram of a three-dimensional information handling system according to a first embodiment of this invention.
Figure 2:
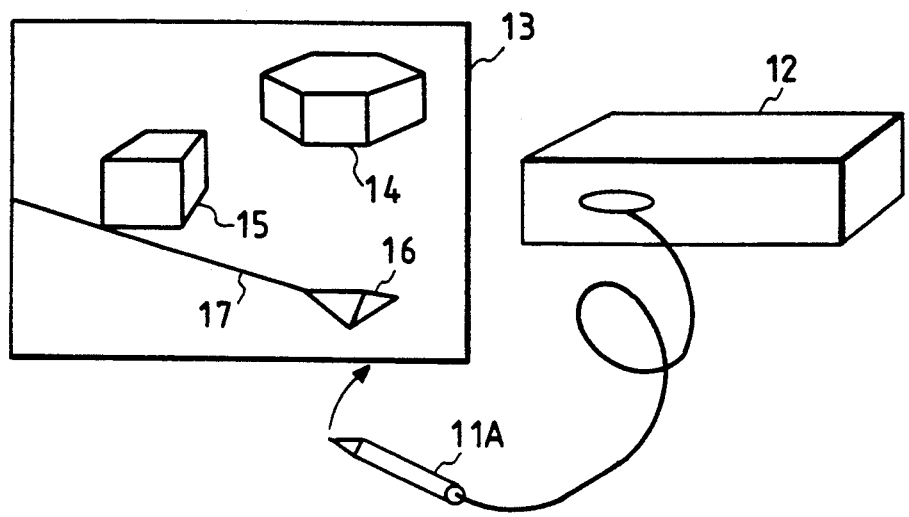
FIGS. 2 and 3 are diagrams of the stylus, the display, and the position and orientation measurement unit of FIG. 1.
Figure 3:
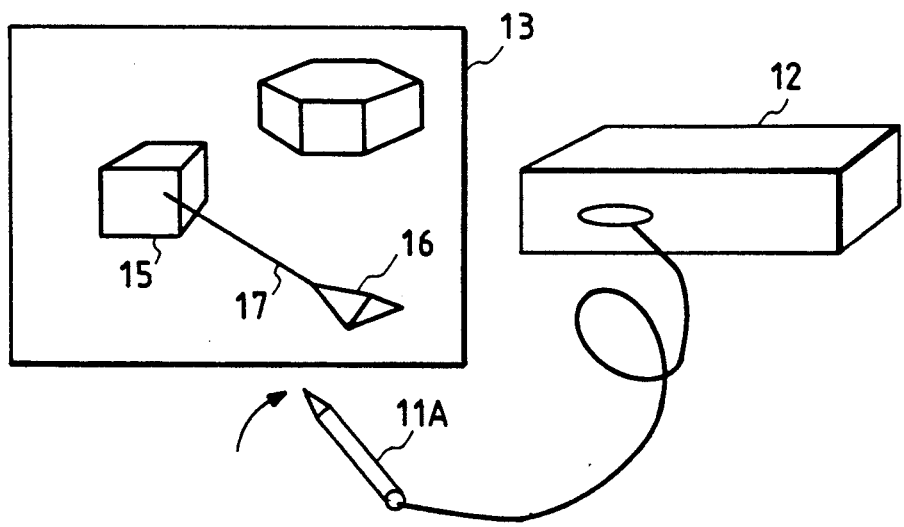

With reference to FIGS. 1-3, a three-dimensional information handling system includes a position and orientation measurement unit 12, a display 13, and a computer 500 such as a work station or a personal computer. The position and orientation measurement unit 12 and the display 13 are electrically connected to the computer 500. A manually-operated movable stylus 11A and an electromagnetic radiation source 11B are electrically connected to the position and orientation measurement unit 12.

The electromagnetic radiation source 11B provides the origin of a virtual three-dimensional space. The stylus 11A has sections for sensing the electromagnetic fields generated from the electromagnetic radiation source 11B. The stylus 11A outputs a signal to the position and orientation measurement unit 12 which represents a three-dimensional point (a cursor position) with respect to the origin, and which also represents a three-dimensional orientation (a cursor orientation) at the point. The position and orientation measurement unit 12 derives information of a three-dimensional position and a three-dimensional orientation from the output signal of the stylus 11A. The user can designate a three-dimensional point and a three-dimensional orientation at the point, that is, a cursor position and a cursor orientation, by operating the stylus 11A. The combination of the stylus 11A, the electromagnetic radiation source 11B, and the position and orientation measurement unit 12 is known (see, for example, U.S. Pat. No. 4,613,866).

The computer 500 controls the display 13 so that three-dimensional objects 14 and 15 can be indicated on the two-dimensional screen of the display 13. The computer 500 receives the position and orientation information from the position and orientation measurement unit 12. The computer 500 controls the display 13 in response to the received position and orientation information so that the display 13 can indicate a three-dimensional cursor 16 at a position and with an orientation depending on the position and orientation information. The cursor 16 represents a point within the virtual three-dimensional space. In addition, the cursor 16 is of a shape having an orientation. One of the objects 14 and 15 can be designated or selected by operating the stylus 11A to control the cursor 16.

As shown in FIGS. 2 and 3, the objects 14 and 15, and the cursor 16 are indicated on the display 13. The cursor 16 is moved by operating the stylus 11A. The cursor 16 is in the form of a triangular cone. A cursor extension line or a straight-line pointer 17 extends from the vertex of the cursor 16 in a direction which agrees with the orientation of the cursor 16. The cursor extension line 17 thus represents the orientation of the cursor 16. The cursor 16 and the cursor extension line 17 move and rotate in accordance with movement and rotation of the stylus 11A relative to the electromagnetic radiation source 11B.

The selection of one of the objects 14 and 15 is executed as follows. In the case where the object 15 is required to be selected, the stylus 11A is rotated until the cursor extension line 17 intersects the object 15 as shown in FIG. 3. Then, a manually-operated input device within the computer 500 is activated to feed a selecting instruction to the main body of the computer 500. The computer 500 selects the object 15, which the cursor extension line 17 intersects, in response to the selection instruction. The selected object 15 is allowed to move and transform in compliance with user's requirements. As described previously, for the selection of one of objects, it is sufficient that the stylus 11A is rotated until the cursor extension line 17 intersects a desired object. During the selection of one of objects, it is unnecessary to displace the stylus 11A until the cursor 16 enters the region occupied by a desired object. Therefore, the selection of one of objects can be executed easily.

Figure 4:
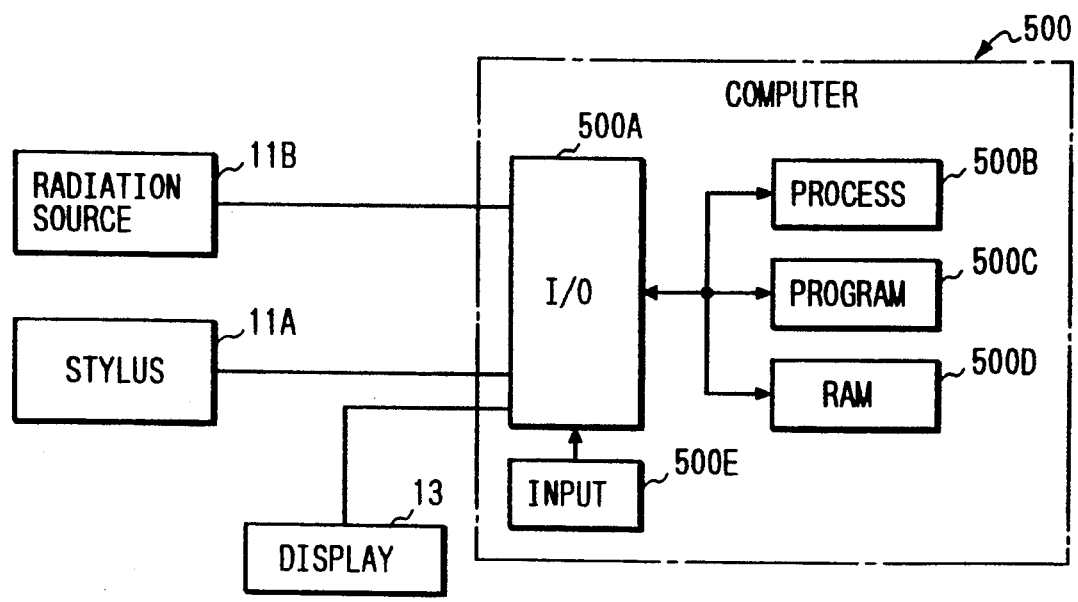
FIG. 4 is a block diagram of the three-dimensional information handling system of FIG. 1.
Figure 5:
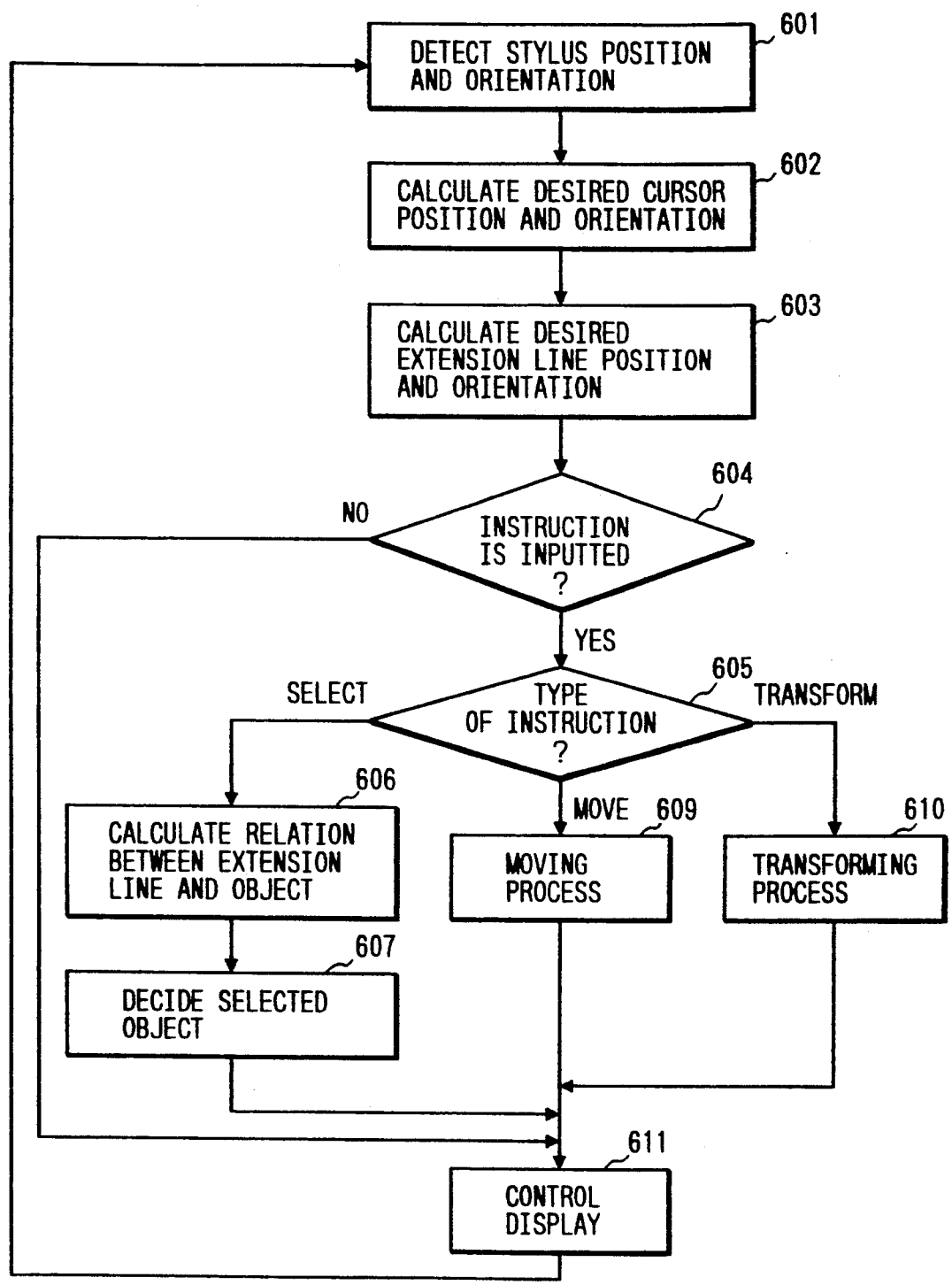
FIG. 5 is a flowchart of a program controlling the computer of FIG. 1.

As shown in FIG. 4, the computer 500 includes a combination of an I/O section 500A, a processing section 500B, a program memory 500C, and a RAM 500D. The computer 500 also includes an input device 500E, such as a keyboard, which is connected to the I/O section 500A. The position and orientation measurement unit 12 and the display 13 are connected to the I/O section 500A of the computer 500. The processing section 500B of the computer 500 operates in accordance with a program stored in the memory 500C. FIG. 5 is a flowchart of the program.

As shown in FIG. 5, a first block 601 of the program derives the current position and the current orientation of the stylus 11A by referring to the output signal from the position and orientation unit 12.

A block 602 following the block 601 calculates a desired position and a desired orientation of the cursor 16 on the basis of the current position and the current orientation of the stylus 11A which are derived by the block 601.

A block 603 following the block 602 calculates a desired position and a desired direction of the cursor extension line 17 on the basis of the current position and the current orientation of the stylus 11A which are derived by the block 601.

A block 604 following the block 603 decides whether or not an instruction is inputted from the input device 500E. When an instruction is inputted from the input device 500E, the program advances to a block 605. Otherwise, the program jumps to a block 611.

The block 605 decides the type of the inputted instruction. When the inputted instruction agrees with a selecting instruction, the program advances to a block 606. When the inputted instruction agrees with a moving instruction, the program advances to a block 609. When the inputted instruction agrees with a transforming instruction (a shape-changing instruction), the program advances to a block 610.

The block 606 calculates the positional relation between the cursor extension line 17 and each indicated object. The block 606 decides whether or not each indicated object intersects the cursor extension line 17, and detects the indicated object which intersects the cursor extension line 17.

A block 607 following the block 606 defines the object, which intersects the cursor extension line 17, as a selection-target object. After the block 607, the program advances to the block 611.

The block 609 processes the data of the selection-target object in accordance with the moving instruction so that the selection-target object can be moved on the display 13 according to user's requirements. After the block 609, the program advances to the block 611.

The block 610 processes the data of the selection-target object in accordance with the transforming instruction so that the selection-target object can be transformed on the display 13 according to user's requirements. After the block 610, the program advances to the block 611.

The block 611 controls the display 13 in response to the data of the current desired position and orientation of the cursor 16 so that the cursor 16 will be indicated at a position on the display 13 which agrees with the current desired position of the cursor 16, and that the orientation of the indicated cursor 16 will correspond to the desired orientation of the cursor 16. The block 611 controls the display 13 in response to the data of the current desired position and direction of the cursor extension line 17 so that the cursor extension line 17 will be indicated in a position on the display 13 which agrees with the current desired position of the cursor extension line 17, and that the direction of the indicated cursor extension line 17 will correspond to the desired direction of the cursor extension line 17. The block 611 controls the display 13 in response to data of objects so that the corresponding objects will be indicated on the display 13. In some cases, the object data includes the selection-target object data. After the block 611, the program returns to the block 601.

In the case where movement of one of indicated objects is required, the stylus 11A is rotated until the cursor extension line 17 intersects a desired object 15. Then, the input device 500E is operated to feed a selecting instruction to the main body of the computer 500. The blocks 606 and 607 of FIG. 5 are executed in response to the selecting instruction. As a result, the desired object is decided to be a selection-target object. Then, the input device 500E is operated to feed a moving instruction to the main body of the computer 500. The block 609 of FIG. 5 is executed in response to the moving instruction. As a result, the selection-target object is moved in accordance with the moving instruction.

In the case where transformation of one of indicated objects is required, the stylus 11A is rotated until the cursor extension line 17 intersects a desired object 15. Then, the input device 500E is operated to feed a selecting instruction to the main body of the computer 500. The blocks 606 and 607 of FIG. 5 are executed in response to the selecting instruction. As a result, the desired object is decided to be a selection-target object. Then, the input device 500E is operated to feed a transforming instruction to the main body of the computer 500. The block 610 of FIG. 5 is executed in response to the transforming instruction. As a result, the selection-target object is transformed in accordance with the transforming instruction.

Figure 6:
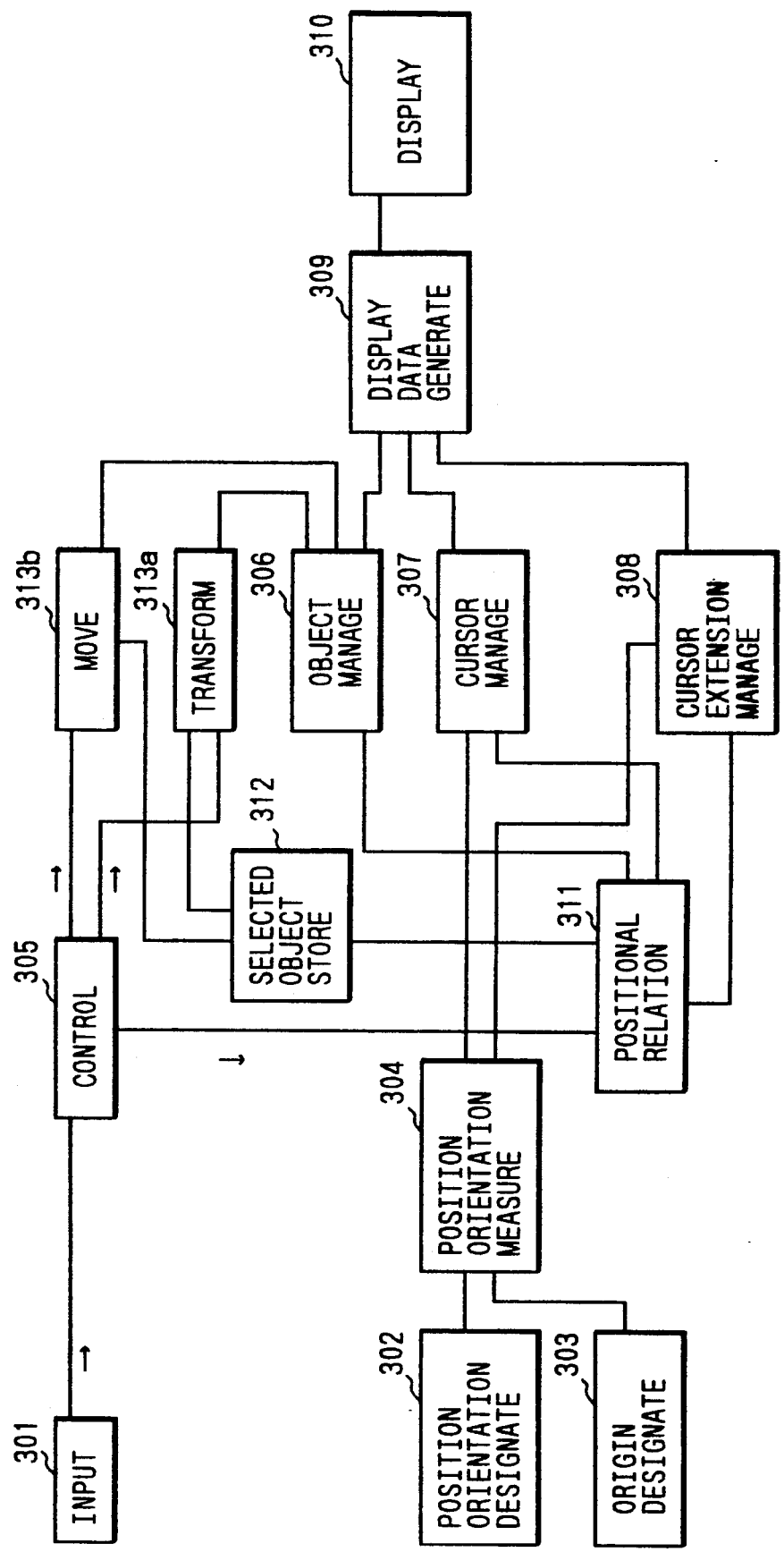
FIG. 6 is a flow diagram of the function of the three-dimensional information handling system of FIG. 1.

FIG. 6 shows the flow diagram of the function of the three-dimensional information handling system of FIG. 1. The three-dimensional information handling system will be further described with reference to FIG. 6. An instruction input section 301 receives instructions such as selecting instructions which are generated in accordance with user's requirements. A three-dimensional position and orientation designating section 302 designates information of three-dimensional position and orientation. A three-dimensional origin designating section 303 designates a three-dimensional origin. A three-dimensional position and orientation measuring section 304 receives the three-dimensional position and orientation information from the three-dimensional position and orientation designating section 302. A control section 305 interprets the user's instruction, and controls the whole of the three-dimensional information handling system. A target object managing section 306 manages data related to a target object, that is, an objected to be processed. A three-dimensional cursor managing section 307 manages position data of a three-dimensional cursor, and calculates the position and orientation of the three-dimensional cursor. A three-dimensional cursor extension line managing section 308 manages data related to a three-dimensional cursor extension line. A display data generating section 309 generates display image data on the basis of the data generated by the sections 306, 307, and 308. A display section 310 indicates the data generated by the display data generating section 309 as a virtual three-dimensional space. A positional-relation processing section 311 executes processing related to the positional relation among the three-dimensional cursor extension line and indicated objects. A selected-object storing section 312 stores data of the selected object. An object-shape processing section 313a and an object-movement processing section 313b compose an object processing section which executes the processing of an object. The object-shape processing section 313a executes a process of changing the shape of an object. The object-movement processing section 313b executes a process of moving an object.

The three-dimensional position and orientation designating section 302 corresponds to the stylus 11A of FIG. 1. The three-dimensional origin designating section 303 corresponds to the electromagnetic radiation source 11B of FIG. 1. The three-dimensional position and orientation measuring section 304 corresponds to the position and orientation measurement unit 12 of FIG. 1. When the user operates the three-dimensional position and orientation designating section 302 to move the three-dimensional cursor, the three-dimensional position and orientation measuring section 304 measures position and orientation data of the three-dimensional position and orientation designating section 302, and feeds the measured position and orientation data to the three-dimensional cursor managing section 307 and the three-dimensional cursor extension line managing section 308. The three-dimensional cursor managing section 307 calculates and updates data of the position and orientation of the three-dimensional cursor on the basis of the received position and orientation data. The three-dimensional cursor extension line managing section 308 calculates and updates data of the position and orientation of the three-dimensional cursor extension line on the basis of the received position and orientation data.

The display data generating section 309 generates updated display image data on the basis of the data generated by the target object managing section 306, the three-dimensional cursor managing section 307, and the three-dimensional cursor extension line managing section 308. The display section 310 indicates an image on the basis of the updated display image data. The display section 310 corresponds to the display 13 of FIG. 1.

When the user inputs a selecting instruction into the three-dimensional information handling system, the selecting instruction is transmitted to the control section 305 via the instruction input section 301. The instruction input section 301 corresponds to the input device 500E of FIG. 4. The control section 305 operates in response to the selecting instruction, and finds an object which intersects the cursor extension line by referring to the data generated by the three-dimensional cursor extension line managing section 308 and the target object managing section 306. The control section 305 stores information of the found object into the selected-object storing section 312 as information of a selection-target object.

The positional-relation processing section 311 executes a process of checking whether or not the three-dimensional cursor extension line intersects each object in the virtual three-dimensional space.

In the case where the user subsequently inputs a moving instruction into the three-dimensional information handling system with respect to the selected object, the object-movement processing section 313b executes data processing for moving the selected object and updates the data in the target object managing section 306. In the case where the user subsequently inputs a transforming instruction into the three-dimensional information handling system with respect to the selected object, the object-shape processing section 313a executes data processing for changing the shape of the selected object and updates the data in the target object managing section 306.

DESCRIPTION OF THE SECOND PREFERRED EMBODIMENT

Figure 7:
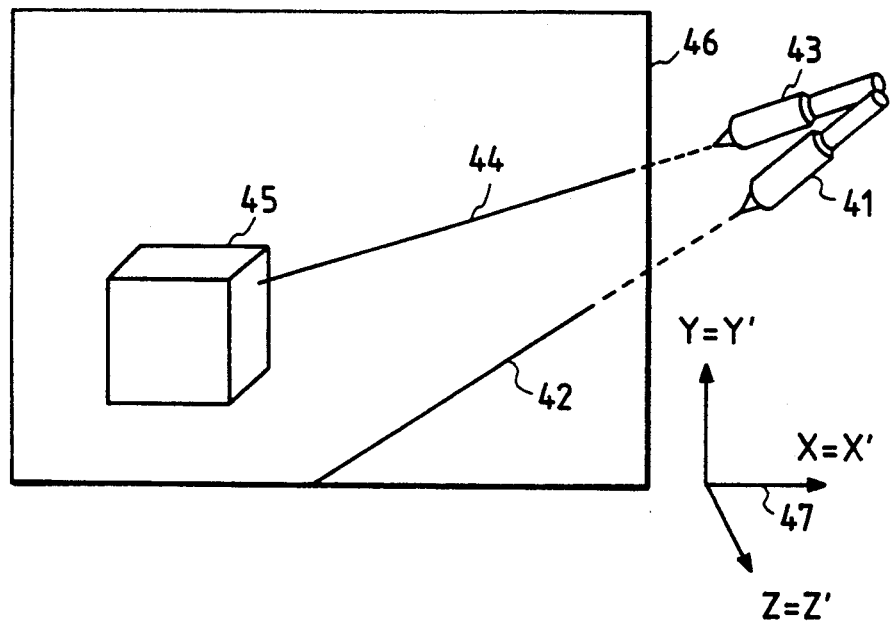
FIG. 7 is a diagram of a display and a stylus in a three-dimensional information handling system according to a second embodiment of this invention.
Figure 8:
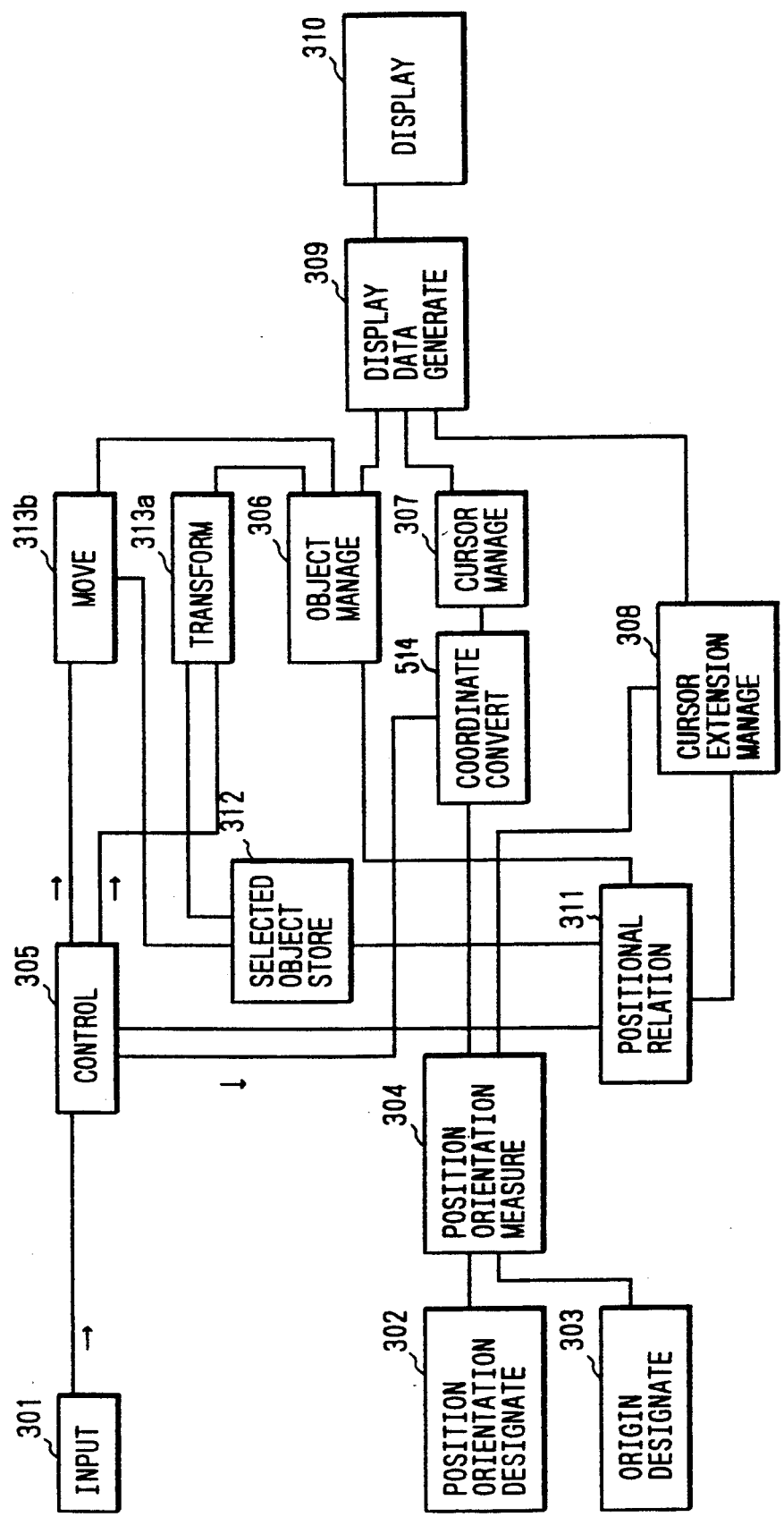
FIG. 8 is a flow diagram of the function of the three-dimensional information handling system according to the second embodiment.

FIGS. 7 and 8 relate to a second embodiment of this invention which is similar to the embodiment of FIGS. 1-6 except for design changes indicated later. FIG. 7 shows the relation between an indicated image and a three-dimensional position and orientation designating section (a stylus) in the second embodiment. As shown in FIG. 7, in the second embodiment, the coordinate system of a virtual three-dimensional space containing a three-dimensional cursor is accorded with the coordinate system of an actual three-dimensional space containing the three-dimensional position and orientation designating section.

As shown in FIG. 7, when an indicated object 45 is required to be selected, the three-dimensional position and orientation section is rotated from a position 41 to a position 43 and also the three-dimensional cursor extension line is rotated from a position 42 to a position 44. The three-dimensional cursor is not indicated but the three-dimensional cursor extension line is indicated on the screen 46 of a display section. In FIG. 7, the reference numeral 47 denotes the coordinate system of the virtual three-dimensional space where the three-dimensional position and orientation designating section exists.

As shown in FIG. 7, the position and orientation of the three-dimensional cursor is accorded with the position and orientation of the three-dimensional position and orientation designating section. and the cursor extension line is indicated on the display screen 46 along the direction which corresponds to the orientation of the three-dimensional position and orientation designating section. It should be noted that the three-dimensional cursor is not indicated on the display screen 46. An indicated object can be easily selected by directing the three-dimensional position and orientation designating section thereto.

FIG. 8 shows the flow diagram of the function of the second embodiment which is similar to the flow diagram of FIG. 6 except that a coordinate converting section 514 is added. The coordinate system of a virtual three-dimensional space containing a three-dimensional cursor is accorded by the coordinate conversion section 514 with the coordinate system of an actual three-dimensional space containing the three-dimensional position and orientation designating section.

DESCRIPTION OF THE THIRD PREFERRED EMBODIMENT

Figure 9:
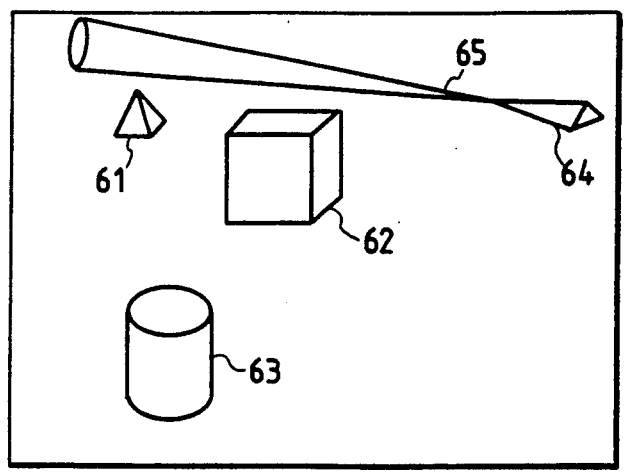
FIGS. 9, 10, and 11 are diagrams showing images indicated by a display in a three-dimensional information handling system according to a third embodiment of this invention.
Figure 10:
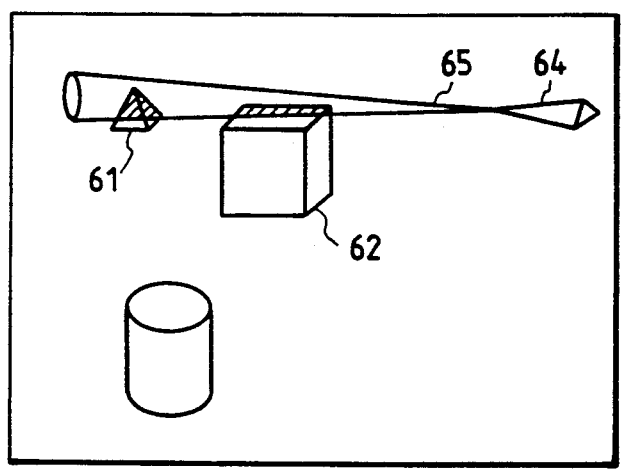
Figure 11:
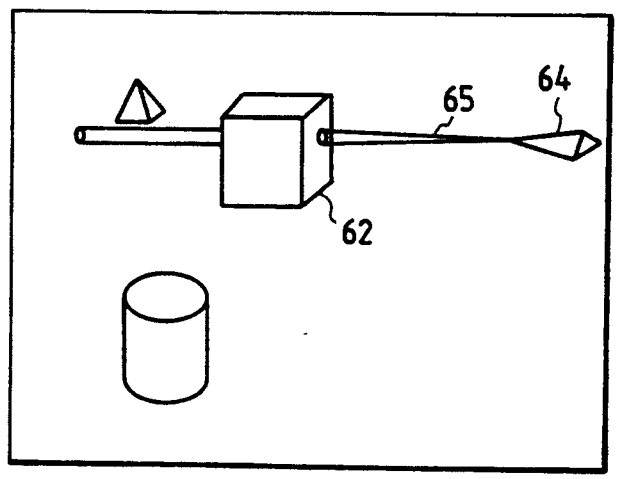

FIGS. 9, 10, 11, and 12 relate to a third embodiment of this invention which is similar to the embodiment of FIGS. 1-6 except for design changes indicated later. FIGS. 9, 10, and 11 show examples of indicated images in the third embodiment. As shown in FIGS. 9, 10, and 11, a three-dimensional cursor 64 and a three-dimensional cursor extension cone 65 are indicated in addition to objects 61, 62, and 63. The vertex of the three-dimensional cursor 64 and the vertex of the three-dimensional cursor extension cone 65 are present on a common point.

The three-dimensional cursor 64 are the three-dimensional cursor extension cone 65 are moved and rotated in accordance with movement and rotation of a three-dimensional position and orientation designating section. The positional relation of the three-dimensional cursor extension cone 65 with each of the objects 61, 62, and 63 is calculated, and the calculated positional relation is used in selecting one of the objects 61, 62, and 63.

It is now assumed that the objects 61, 62, and 63, the three-dimensional cursor 64, and the three-dimensional cursor extension cone 65 have a positional relation such as shown in FIG. 9, and that the user requires the selection of the object 62. The user rotates the three-dimensional position and orientation designating section, so that the three-dimensional cursor 64 and the three-dimensional cursor extension cone 65 rotate commensurately. The user continues the rotation of the three-dimensional position and orientation designating section until the three-dimensional cursor extension cone 65 intersects the target object 62 as shown in FIG. 10.

In the case where the three-dimensional cursor extension cone 65 intersects both the objects 61 and 62 as shown in FIG. 10, the user inputs an instruction of reducing the diameter of the three-dimensional cursor extension cone 65 into the three-dimensional information handling system. The diameter of the three-dimensional cursor extension cone 65 is decreased in response to the reducing instruction, so that the three-dimensional cursor extension cone 65 intersects only the target object 62 as shown in FIG. 11. Then, the user inputs a selecting instruction into the three-dimensional information handling system so that the selection of the target object 62 is executed. After the selection of the target object 62 is completed, the user inputs a moving instruction or a transforming instruction into the three-dimensional information handling system so that movement or transformation of the target object 62 is executed.

A plurality of objects which intersect the three-dimensional cursor extension cone 65 can be selected simultaneously. In some cases, the simultaneous selection of a plurality of objects can be realized by increasing the diameter of the three-dimensional cursor extension cone 65.

Figure 12:
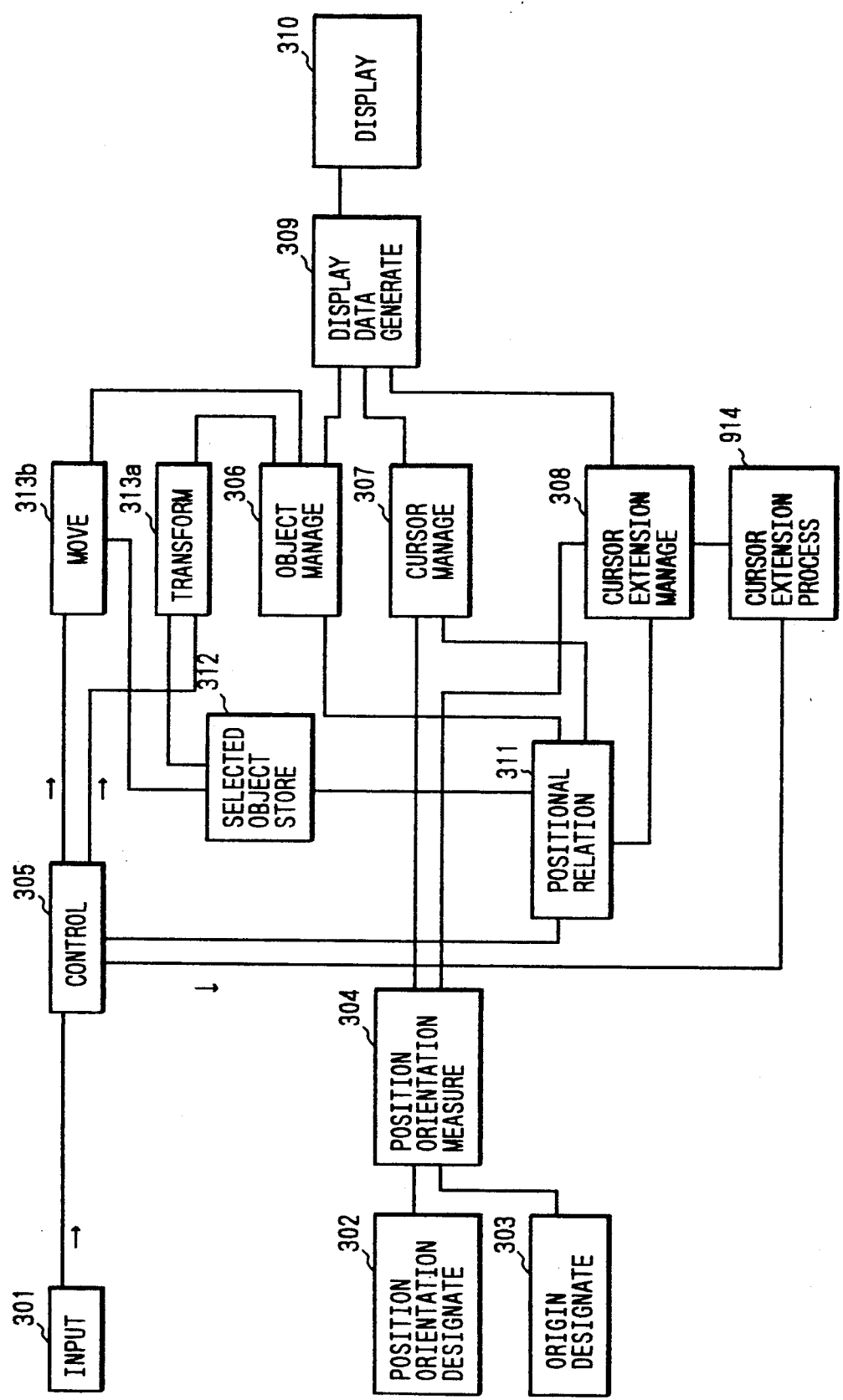
FIG. 12 is a flow diagram of the function of the three-dimensional information handling system according to the third embodiment.

FIG. 12 shows the flow diagram of the function of the third embodiment which is similar to the flow diagram of FIG. 6 except that a three-dimensional cursor extension cone processing section 914 is added. The three-dimensional cursor extension cone processing section 914 changes the diameter of the three-dimensional cursor extension cone 65 in accordance with a signal outputted from a control section 305. Specifically, the three-dimensional cursor extension cone processing section 914 executes data processing for changing the diameter of the three-dimensional cursor extension cone 65 in compliance with user's reducing instruction or increasing instruction, and updates the data in a three-dimensional cursor extension cone managing section 308.

DESCRIPTION OF THE FOURTH PREFERRED EMBODIMENT

Figure 13:
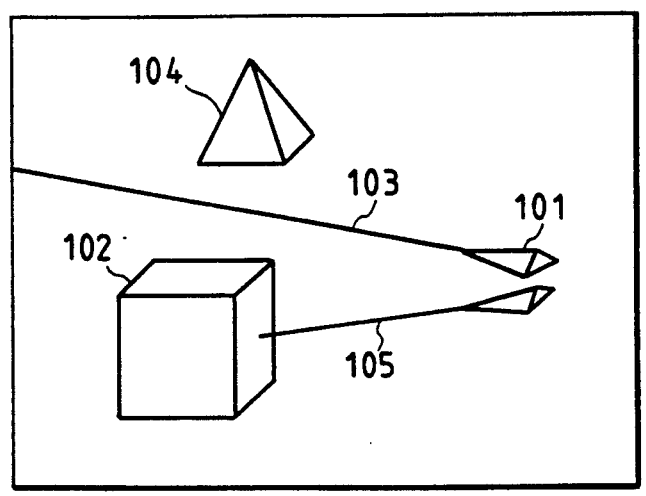
FIGS. 13, 14, and 15 are diagrams showing images indicated by a display in a three-dimensional information handling system according to a fourth embodiment of this invention.
Figure 14:
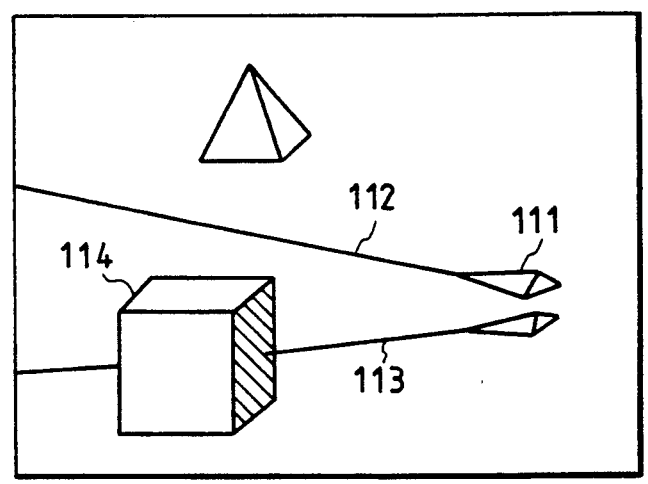
Figure 15:
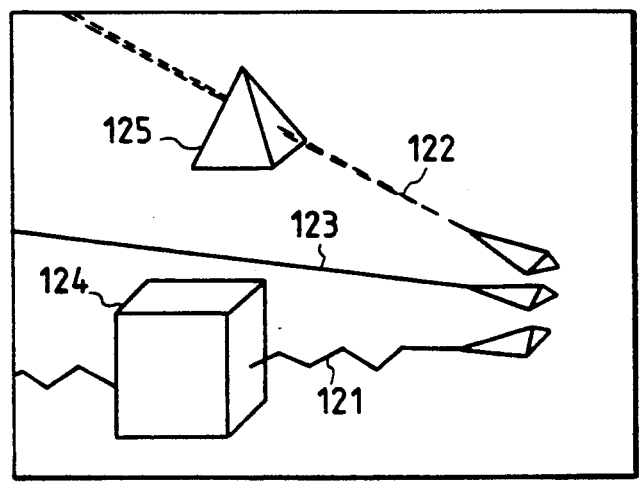

FIGS. 13, 14, 15, and 16 relate to a fourth embodiment of this invention which is similar to the embodiment of FIGS. 1–6 except for design changes indicated later. FIGS. 13, 14, and 15 show examples of indicated images in the fourth embodiment. As shown in FIGS. 13, 14, and 15, a three-dimensional cursor and a three-dimensional cursor extension line are indicated in addition to two objects composed of a cube and a polygonal cone respectively.

In FIG. 13, the three-dimensional cursor is rotated from a position 101 while the three-dimensional cursor extension line is rotated from a position 103 to a position 105. When the three-dimensional cursor extension line assumes the position 105, the three-dimensional cursor extension line intersects the cube 102. In this case, the three-dimensional cursor extension line is cut at the front surface of the cube 105, and is prevented from being indicated in the region rearward of the front surface of the cube 105. Under the conditions of FIG. 13, when a selecting instruction is inputted, the cube 102 is always selected.

In FIG. 14, the three-dimensional cursor is rotated from a position 111 while the three-dimensional cursor extension line is rotated from a position 112 to a position 113. When the three-dimensional cursor extension line assumes the position 113, the three-dimensional cursor extension line intersects the cube 114. In this case, the color of the front surface of the cube 114 is changed so as to differ from the color of the other surfaces of the cube 114. The color change represents that the cube 114 is a proposed selection object.

In FIG. 15, the three-dimensional cursor is rotated while the three-dimensional cursor extension line is rotated from a position 121 to a position 122 through a position 123. When the three-dimensional cursor extension line assumes the position 121, the three-dimensional cursor extension line intersects the cube 124. In this case, the three-dimensional cursor extension line is composed of a zigzag line. When the three-dimensional cursor extension line assumes the position 123, the three-dimensional cursor extension line does not intersect any objects. In this case, the three-dimensional cursor extension line is composed of a straight line. When the three-dimensional cursor extension line assumes the position 122, the three-dimensional cursor extension line intersects the polygonal cone 125. In this case, the three-dimensional cursor extension line is composed of a pair of broken lines. In this way, the conditions of the three-dimensional cursor extension line depends on the shape of an object which intersects the three-dimensional cursor extension line.

Figure 16:
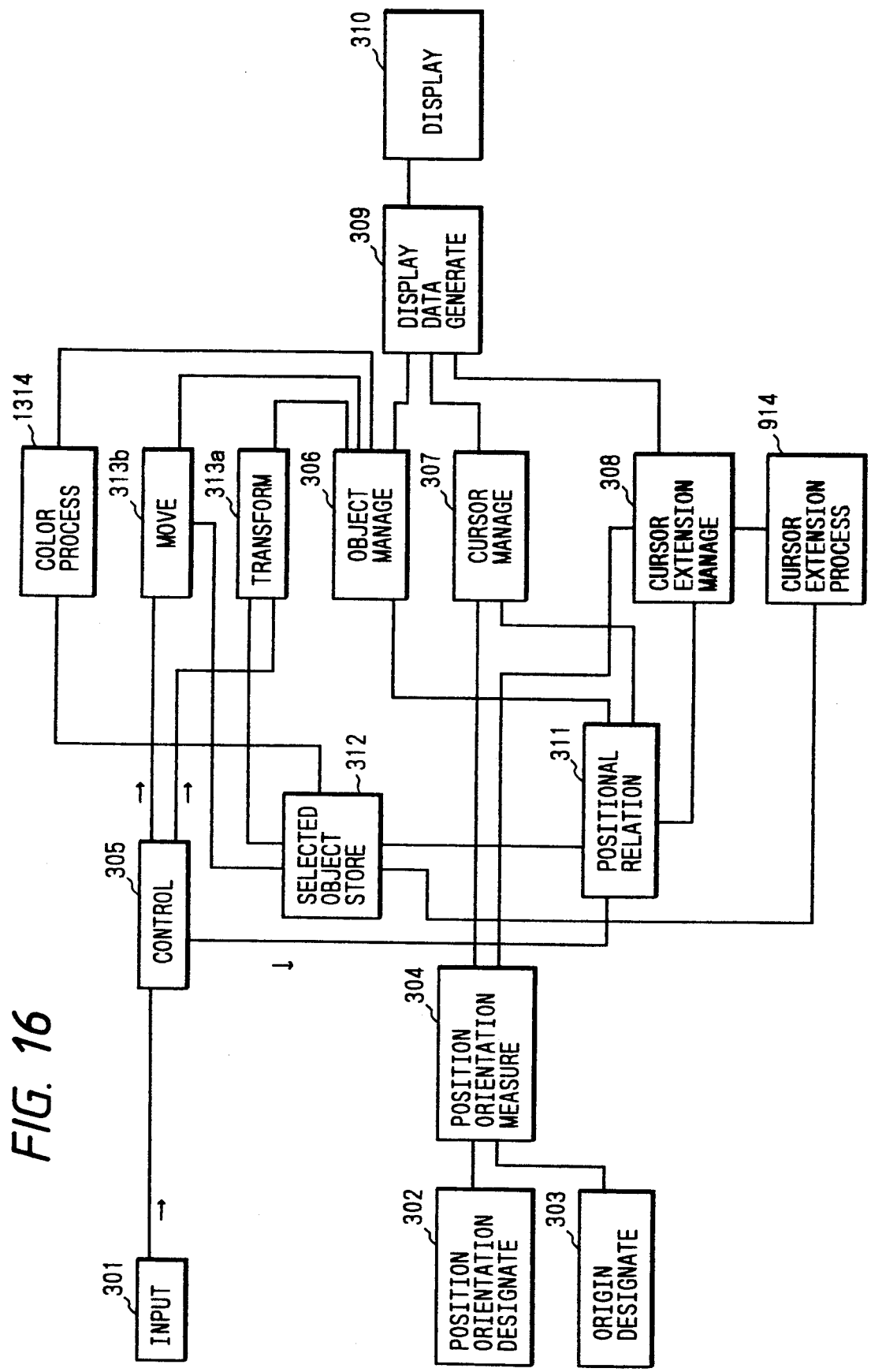
FIG. 16 is a flow diagram of the function of the three-dimensional information handling system according to the fourth embodiment.

FIG. 16 shows the flow diagram of the function of the fourth embodiment which is similar to the flow diagram of FIG. 6 except that a three-dimensional cursor extension cone processing section 914 and an object-color processing section 1314 are added. The three-dimensional cursor extension cone processing section 914 processes and updates the data in a three-dimensional cursor extension cone managing section 308, and thereby changes the conditions of the three-dimensional cursor extension line in accordance with the data fed from a selected-object storing section 312. The object-color processing section 1314 processes and updates the data in a target object managing section 306, and thereby changes the color of a proposed selection object on the basis of the data fed from the selected-object storing section 312.

A positional-relation processing section 311 finds an object or objects which intersect the three-dimensional cursor extension line by referring to the data fed from the three-dimensional cursor extension line managing section 308 and the target object managing section 306. The positional-relation processing section 311 continues to execute the finding process independent of instructions from a control section 305. The positional-relation processing section 311 stores data of the found object or objects into the selected-object storing section 312 as data of proposed selection objects. As described previously, the object-color processing section 1314 processes and updates the data in the target object managing section 306 to determine the color and brightness of the proposed selection objects on the basis of the data from the selected-object storing section 312. The three-dimensional cursor extension cone processing section 914 processes and updates the data in the three-dimensional cursor extension cone managing section 308, and thereby changes the conditions of the three-dimensional cursor extension line in accordance with the data fed from the selected-object storing section 312. A display data generating section 309 generates display image data on the basis of the data generated by the target object managing section 306, the three-dimensional cursor managing section 307, and the three-dimensional cursor extension line managing section 308.

When the user inputs a selecting instruction into the three-dimensional information handling system, the selecting instruction is fed to the control section 305 via an instruction input section 301. The control section 305 decides the data of a proposed selection object in the selected-object storing section 312 to be data of a finally selected object.

DESCRIPTION OF THE FIFTH PREFERRED EMBODIMENT

Figure 17:
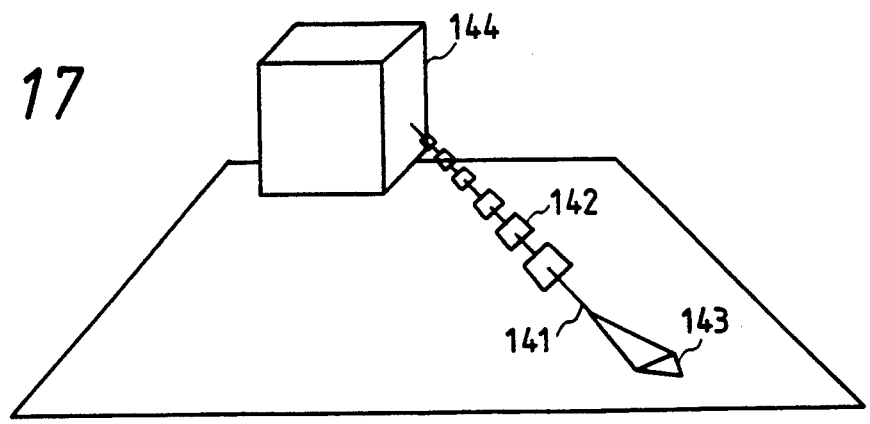
FIGS. 17, 18, and 19 are diagrams showing images indicated by a display in a three-dimensional information handling system according to a fifth embodiment of this invention.
Figure 18:
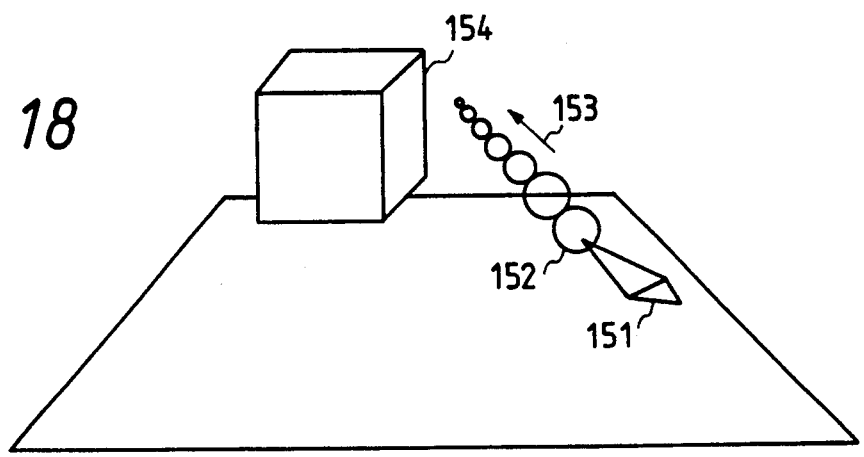
Figure 19:
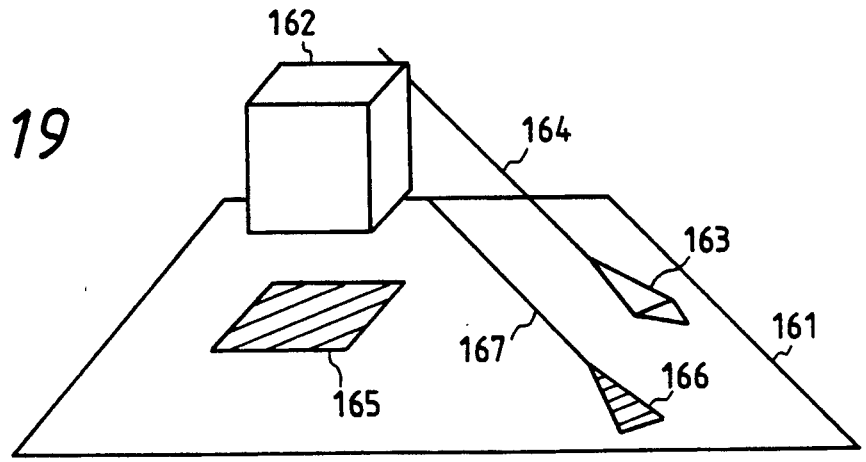

FIGS. 17, 18, 19, and 20 relate to a fifth embodiment of this invention which is similar to the embodiment of FIGS. 1-6 except for design changes indicated later. FIGS. 17, 18, and 19 show examples of indicated images in the fifth embodiment.

In FIG. 17, symbols (figures) 142 having similar shapes are arranged at equal intervals along a three-dimensional cursor extension line 141. The arrangement of the symbols 142 enables the user to easily recognize the distance between a three-dimensional cursor 143 and an object 144.

In FIG. 18, a three-dimensional cursor extension symbol (figure) 152 is continuously moved along a direction 153 which agrees with the orientation of a three-dimensional cursor 151. In this case, the user can accurately recognizes the positional relation between the three-dimensional cursor 151 and an object 154.

In FIG. 19, a plane 161 is indicated below an object 162, a three-dimensional cursor 163, and a three-dimensional cursor extension line 164. It is presumed that light is applied from above, and images of the object 162, the three-dimensional cursor 163, and the three-dimensional cursor extension line 164 are projected onto the plane 161 as shadows 165, 166, and 167 of the object 162, the three-dimensional cursor 163, and the three-dimensional cursor extension line 164. The shadows 165, 166, and 167 are actually indicated on the plane 161. The shadows 165, 166, and 167 enable the user to easily recognize the positional relation between the three-dimensional cursor 163 and the object 162, and also the positional relation between the three-dimensional cursor extension line 164 and the object 162.

Figure 20:
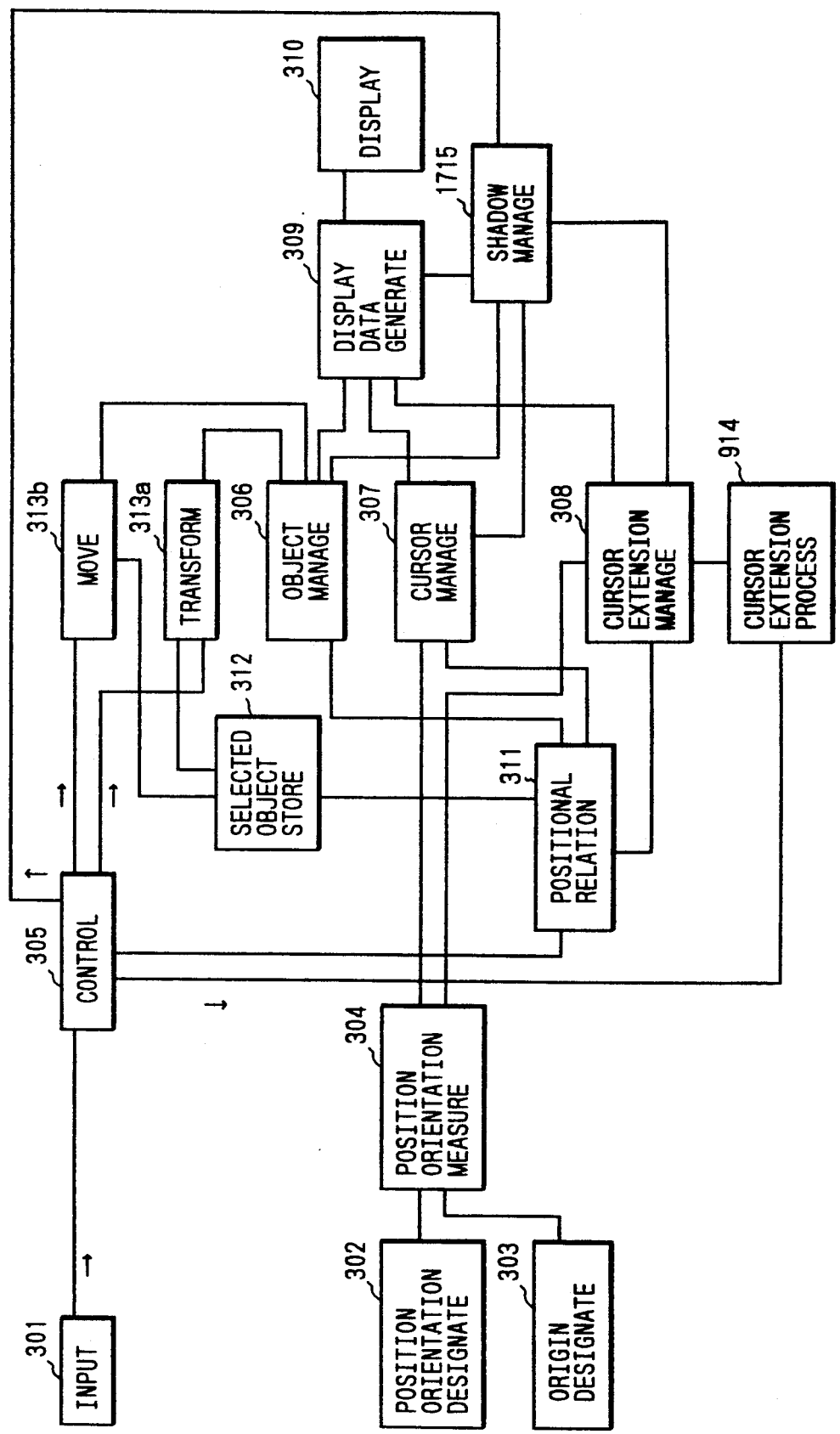
FIG. 20 is a flow diagram of the function of the three-dimensional information handling system according to the fifth embodiment.

FIG. 20 shows the flow diagram of the function of the fifth embodiment which is similar to the flow diagram of FIG. 12 except that a shadow managing section 1715 is added. The shadow managing section 1715 generates data of the plane 161, containing shadows of an object or objects, the three-dimensional cursor, and the three-dimensional cursor extension line, on the basis of the data fed from a target object managing section 306, a three-dimensional cursor managing section 307, and a three-dimensional cursor extension line managing section 308. The shadow managing section 1715 feeds the generated data of the plane 161 to a display data generating section 309.

DESCRIPTION OF THE SIXTH PREFERRED EMBODIMENT

Figure 21:
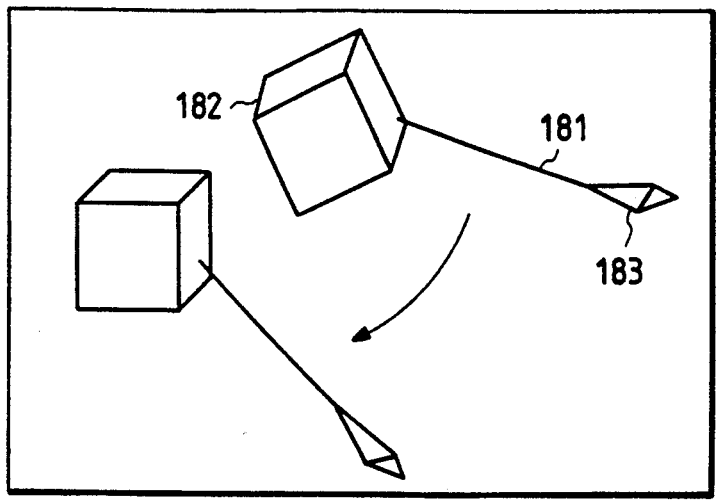
FIGS. 21, 22, and 23 are diagrams showing images indicated by a display in a three-dimensional information handling system according to a sixth embodiment of this invention.
Figure 22:
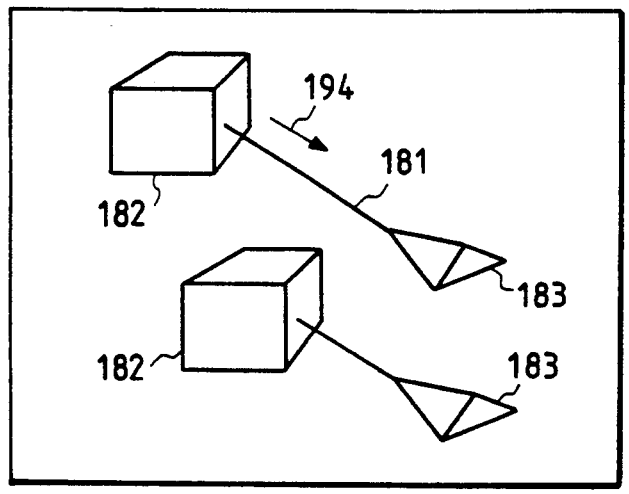
Figure 23:
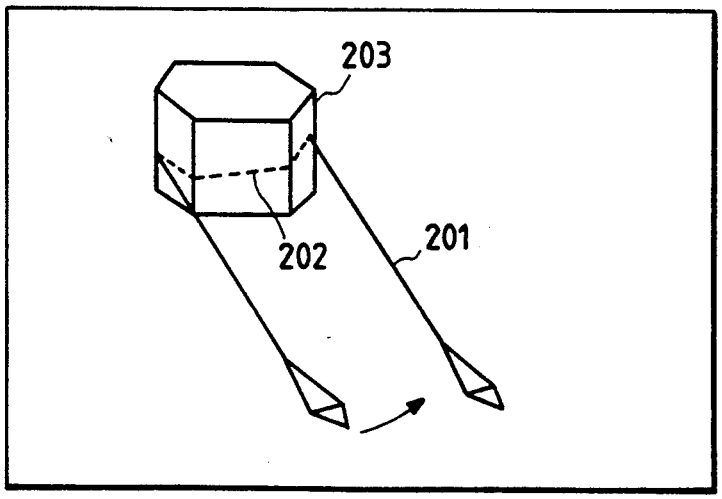

FIGS. 21, 22, 23, and 24 relate to a sixth embodiment of this invention which is similar to the embodiment of FIGS. 1-6 except for design changes indicated later. FIGS. 21, 22, and 23 show examples of indicated images in the sixth embodiment.

In FIG. 21, a three-dimensional cursor extension line 181 extending from a three-dimensional cursor 183 intersects a selected object 182. As a three-dimensional position and orientation designating section is moved, the selected object 182 moves together with the three-dimensional cursor extension line 181 and the three-dimensional cursor 183.

In FIG. 22, a three-dimensional cursor extension line 181 extending from a three-dimensional cursor 183 intersects a selected object 182. When an input device is operated to input a moving instruction, the selected object 182 moves together with the three-dimensional cursor extension line 181 and the three-dimensional cursor 183 in a direction along the three-dimensional cursor extension line 181. This movement of the selected object 182 is enabled without operating the three-dimensional position and orientation designating section.

In FIG. 23, as a three-dimensional cursor and a three-dimensional cursor extension line 201 are moved, a selected object 203 is cut along a line 202 which corresponds to movement of the intersection between the selected object 203 and the three-dimensional cursor extension line 201.

Figure 24:
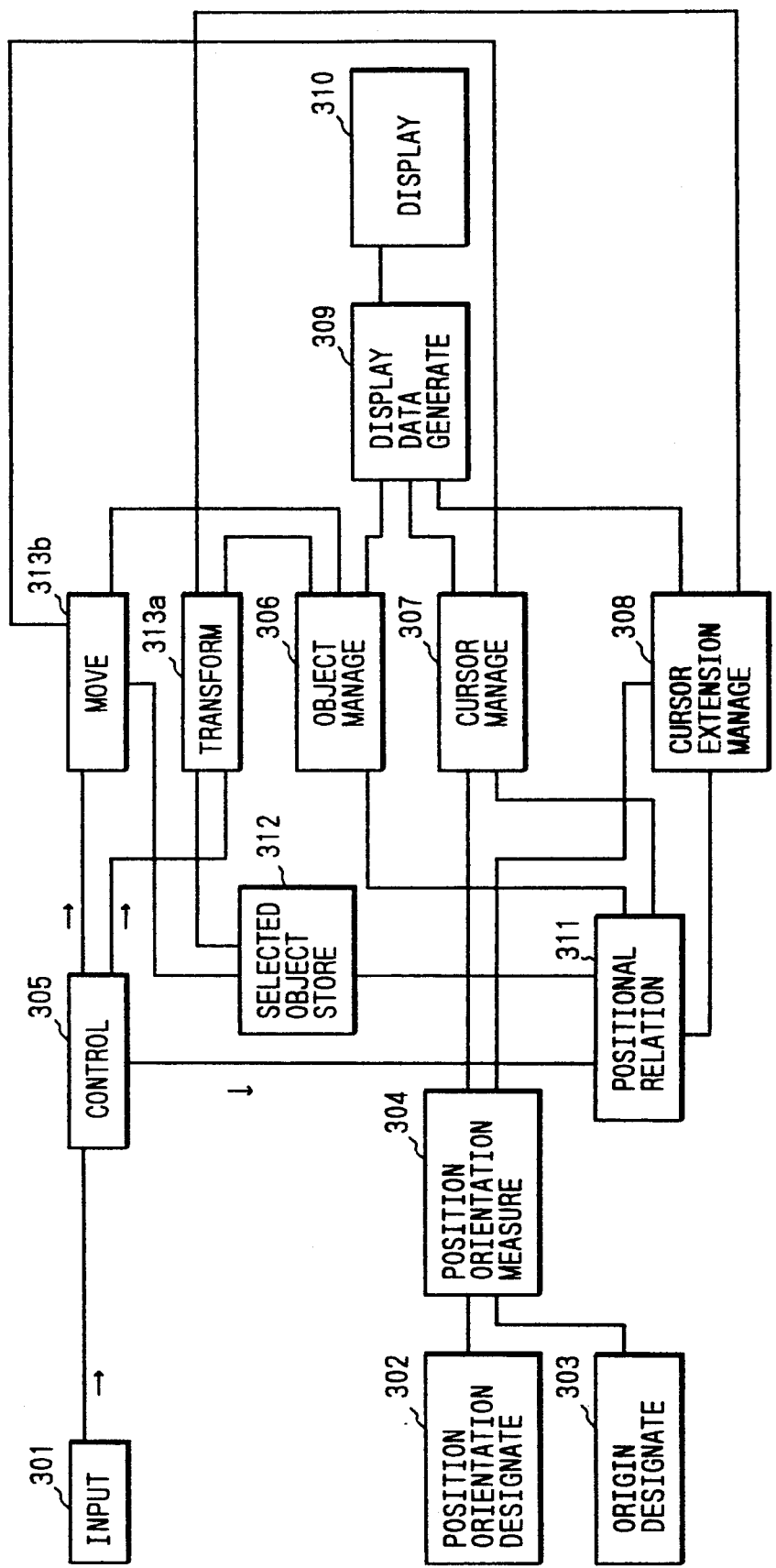
FIG. 24 is a flow diagram of the function of the three-dimensional information handling system according to the sixth embodiment.

FIG. 24 shows the flow diagram of the function of the sixth embodiment which is similar to the flow diagram of FIG. 6 except that an object-shape processing section 313a and an object-movement processing section 313b process data of a selected object on the basis of data fed from a three-dimensional cursor managing section 307 and a three-dimensional cursor extension line managing section 308.

In the case where a moving instruction is inputted via an instruction input section 301, each time a three-dimensional position and orientation designating section 302 is moved, a three-dimensional position and orientation measuring section 304 feeds data of the position and orientation of the three-dimensional position and orientation designating section 302 to the three-dimensional cursor managing section 307 and the three-dimensional cursor extension line managing section 308 while data processing for moving the three-dimensional cursor and the three-dimensional cursor extension line is executed. Specifically, with respect to data of a selected object which is stored in a selected-object storing section 312, the object-movement processing section 313b calculates a new position of the selected object on the basis of the data in a target object managing section 306 and the three-dimensional cursor managing section 307, and updates the data in the target object managing section 306. Then, a display data generating section 309 updates display image data by using the data fed from the target object managing section 306, the three-dimensional cursor managing section 307, and the three-dimensional cursor extension line managing section 308.

In the case where a transforming instruction is inputted via the instruction input section 301, each time the three-dimensional position and orientation designating section 302 is moved, the three-dimensional position and orientation measuring section 304 feeds data of the position and orientation of the three-dimensional position and orientation designating section 302 to the three-dimensional cursor managing section 307 and the three-dimensional cursor extension line managing section 308 while data processing for moving the three-dimensional cursor and the three-dimensional cursor extension line is executed. Simultaneously, with respect to data of a selected object which is stored in the selected-object storing section 312, the object-shape processing section 313a executes data processing for changing the shape of the selected object on the basis of the data in the target object managing section 306 and the three-dimensional cursor extension line managing section 308, and updates the data in the target object managing section 306. Then, the display data generating section 309 updates the display image data by using the data fed from the target object managing section 306, the three-dimensional cursor managing section 307, and the three-dimensional cursor extension line managing section 308.

DESCRIPTION OF THE SEVENTH PREFERRED EMBODIMENT

Figure 25:
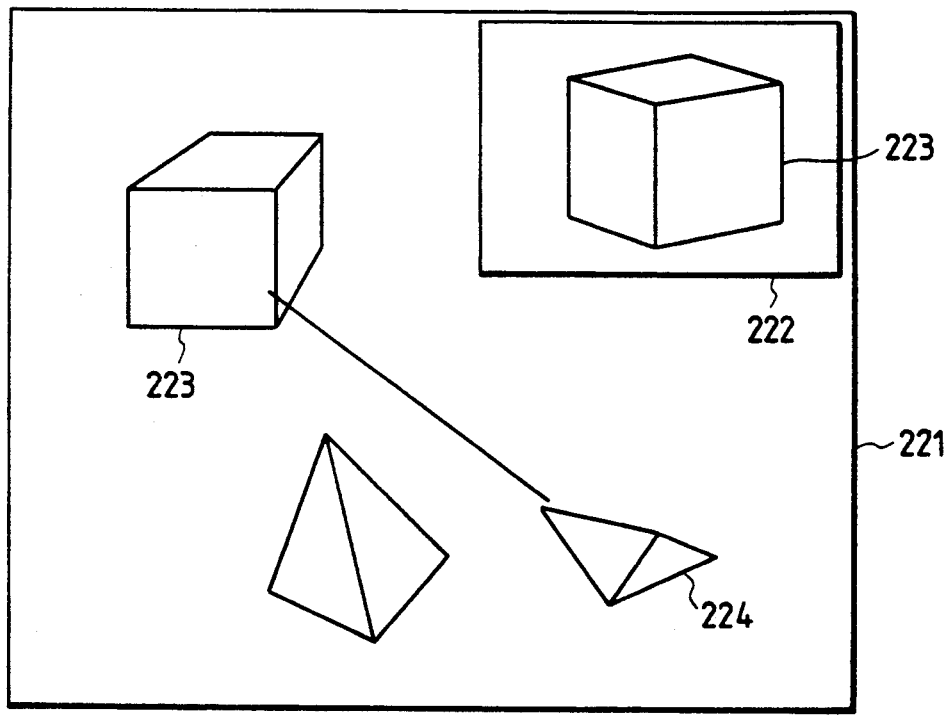
FIG. 25 is a diagram showing an image indicated by a display in a three-dimensional information handling system according to a seventh embodiment of this invention.
Figure 26:
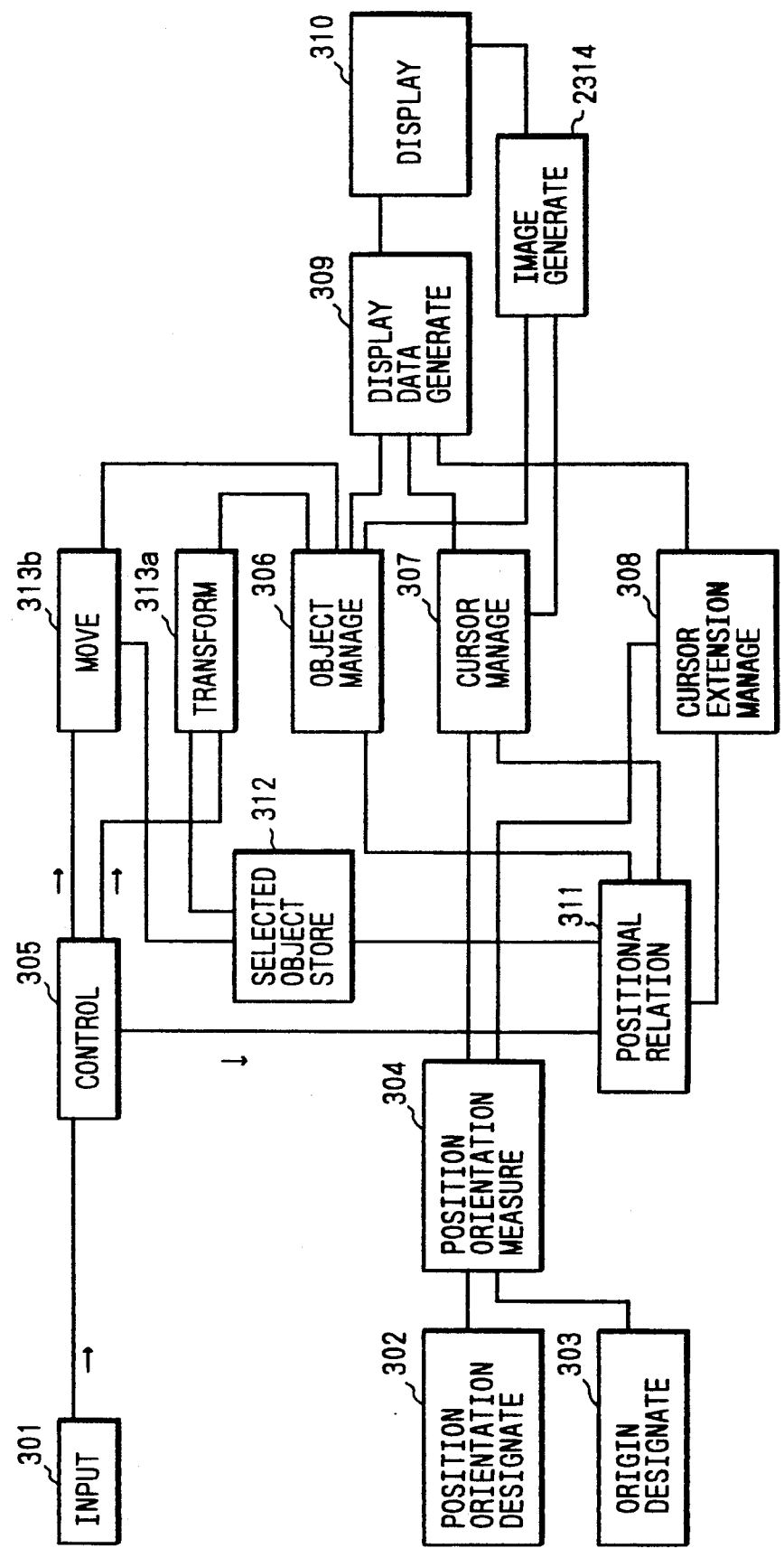
FIG. 26 is a flow diagram of the function of the three-dimensional information handling system according to the seventh embodiment.

FIGS. 25 and 26 relate to a seventh embodiment of this invention which is similar to the embodiment of FIGS. 1–6 except for design changes indicated later. FIG. 25 shows an example of an indicated image in the seventh embodiment. In FIG. 25, a display screen 221 is divided into a normal area and a window area 222. Objects including a cube 223, a three-dimensional cursor 224, and a three-dimensional cursor extension line are indicated in the normal area of the display screen 221. The object 223 which intersects the three-dimensional cursor extension line is also indicated in the window area 222 of the display screen 221. Specifically, an image of the object 223 which is taken as viewed from the three-dimensional cursor 224 is indicated in the window area 222 of the display screen 221. The window area 222 is designed so as to show a proposed selection object. When a selecting instruction is inputted, the object 223 indicated in the window area 222 of the display screen 221 is selected.

FIG. 26 shows the flow diagram of the function of the seventh embodiment which is similar to the flow diagram of FIG. 6 except that an image data generating section 2314 is added. The image data generating section 2314 generates data on the basis of cursor position and orientation data and target object data fed from a three-dimensional cursor managing section 307 and a target object managing section 306. The data generated by the image data generating section 2314 represents an image of a target object which is taken as viewed from the three-dimensional cursor. The image data is fed from the image data generating section 2314 to a display section 310 so that the image data will be indicated on the display section 310.

What is claimed is:

1. A three-dimensional information handling system comprising:
   a display device for indicating a virtual three-dimensional space on a two-dimensional screen;
   a position and orientation designating device for designating information of a three-dimensional position and a three-dimensional orientation;
   a position and orientation measuring device for measuring the three-dimensional position and orientation information which is designated by the portion and orientation designating device;
   a processing device for calculating three-dimensional display information on the basis of the three-dimensional position and orientation information measured by the position and orientation measuring device, and for controlling the display device and the position and orientation measuring device;
   means for indicating a cursor on the screen of the display device;
   means for moving the cursor in accordance with movement of the position and orientation designating device;
   means for indicating a figure on the screen of the display, the figure extending from the cursor in a direction independent of a velocity vector of the cursor and being in a fixed positional relation with the cursor; and
   means for moving the figure in accordance with movement of the cursor.

2. A three-dimensional information handling system comprising:
   a three-dimensional origin designating section;
   a position and orientation designating section for designating three-dimensional information according to a positional relation with the three-dimensional origin designating section;
   a position and orientation measuring section for reading the three-dimensional information which is designated by the position and orientation designating section:
   an instruction input section for inputting an instruction;
   a control section for analyzing an output signal of the instruction input section, and generating a control signal in response to the output signal of the instruction input section;
   a target object managing section for managing data of a target object in a virtual three-dimensional space;
   a cursor managing section for managing data of a three-dimensional cursor which moves in the virtual three-dimensional space in accordance with movement of the position and orientation designating section;
   a cursor extension figure managing section for managing data of a three-dimensional figure extending from the cursor in a direction independent of a velocity vector of the cursor and being in a fixed positional relation with the cursor, the being extension figure moving in accordance with movement of the cursor;
   a positional relation processing section for calculating a relation between the cursor extension figure and each of objects on the basis of the data managed by the cursor extension figure managing section and the target object managing section in response to the control signal generated by the control section, and for selecting one of the objects in accordance with the calculated relations;
   a selected object storing section for storing data of the object selected by the positional relation processing section;
   an object processing section for processing the data of the target object on the basis of the data in the selected object storing section and the target object managing section in response to the control signal generated by the control section, and for updating the data in the target object managing section; and a display date generating section for generating output data on the basis of the data in the cursor managing section, the cursor extension figure managing section, and the target object managing 3. A three-dimensional information handling system comprising:
- a display device for indicating a virtual three-dimensional space on a two-dimensional screen;
- a position and orientation designating device for designating information of a three-dimensional position and a three-dimensional orientation:
- a position and orientation measuring device for measuring the three-dimensional position and orientation information which is designated by the position and orientation designating devices;
- a processing device for calculating three-dimensional display information on the basis of the three-dimensional position and orientation information measured by the position and orientation measuring device, and for controlling the display device and the position and orientation measuring device;
- means for indicating a cursor on the screen of the display device;
- means for moving the cursor in accordance with movement of the position and orientation designating device;
- means for indicating a figure on the screen of the display, the figure extending from the cursor and being in a fixed positional relation with the cursor; and
- means for moving the figure in accordance with movement of the cursor;
- wherein the figure extends in a direction corresponding to an orientation of the position and orientation designating device.

4. The three-dimensional information handling system of claim 2, further comprising a coordinate converting section for according a coordinate system of measurement of the position and orientation designating section with a coordinate system of the virtual three-dimensional space, and for according an orientation of the cursor with an orientation of the position and orientation designating section.

5. The three-dimensional information handling system of claim 1, further comprising means for transforming the figure in accordance with a transforming instruction.

6. The three-dimensional information handling system of claim 2, further comprising a cursor extension figure processing section for processing the cursor extension figure on the basis of a signal outputted from the control section.

7. The three-dimensional information handling system of claim 1, further comprising means for transforming the figure on the basis of a proposed selection object designated by the position and orientation designating section.

8. The three-dimensional information handling system of claim 7, wherein the figure is cut by the proposed selection object.

9. The three-dimensional information handling system of claim 7, further comprising means for changing a color of at least part of the proposed selection object.

10. The three-dimensional information handling system of claim 2, further comprising a cursor extension figure processing section for processing the cursor extension figure on the basis of the data in the selected object storing section and the cursor extension figure managing section.

11. The three-dimensional information handling system of claim 1, wherein said means for indicating comprises means for generating segments of the figure representing distances from the cursor.

12. The three-dimensional information handling system of claim 1, wherein the figure is movable along a direction which corresponds to an orientation of the cursor.

13. The three-dimensional information handling system of claim 1, further comprising means for indicating a plane on the screen of the display device, and means for providing shadows of objects, the cursor, and the figure on the plane.

14. The three-dimensional information handling system of claim 2, further comprising a shadow managing section for processing data related to a projection plane on the basis of the data in the target object managing section, the cursor managing section, and the cursor extension figure managing section.

15. The three-dimensional information handling system of claim 1, further comprising means for moving a selected object and the figure in accordance with movement of the position and orientation designating section.

16. The three-dimensional information handling system of claim 1, further comprising means for cutting a selected object with the figure.

17. The three-dimensional information handling system of claim 2, wherein the data of the selected object is processed by using the data of the cursor extension figure which is managed by the cursor extension figure managing section.

18. The three-dimensional information handling system of claim 1, further comprising means for indicating a virtual three-dimensional space and an image of the virtual three-dimensional space which is taken as viewed from the cursor on the screen of the display device.

19. The three-dimensional information handling system of claim 2, further comprising an image data generating section for generating an image as viewed from the cursor on the basis of the cursor position and orientation data managed by the cursor managing section and the target object data managed by the target object managing section.

20. A three-dimensional information handling system for use with a two-dimensional screen, comprising:
- a manually-operated movable member;
- means for indicating a three-dimensional cursor on the screen;
- means for indicating a three-dimensional pointer on the screen, the pointer representing an orientation of the cursor in a direction independent of a velocity vector of the cursor and being in a fixed positional relation with the cursor;
- means for moving the cursor and the pointer in accordance with movement of the movable member;
- means for indicating three-dimensional object images on the screen;
- means for detecting one of the object images which intersects the pointer;
- means for selecting the object image which intersects the pointer in response to a selecting instruction; and
- means for controlling the selected object image in response to a control instruction.

21. The three-dimensional information handling system of claim 20, wherein said means for indicating a three dimensional pointer comprises means for generating an image of the pointer to have a fixed angular orientation relative to the orientation of the cursor.

* * * * *